Patented Jan. 18, 1944

2,339,349

UNITED STATES PATENT OFFICE 2,339,349

CHROMIUM OXIDE CATALYST

Glen H. Morey, Terre Haute, Ind., assignor to Phillips Petroleum Company, a corporation of Delaware No Drawing. Application October 1, 1940, Serial No. 359,295

12 Claims. (Cl. 252—251)

This invention relates to the preparation of chromium oxide catalysts, and more particularly to the preparation of catalysts comprising dark or black unglowed chromium oxide. This application is a continuation-in-part of my copending application Serial No. 113,091, filed November 27, 1936, which has issued as Patent No. 2,288,320.

Catalysts comprising dark, unglowed chromium oxide are useful for promoting many reactions. They are especially useful for treating individual hydrocarbons and hydrocarbon mixtures, such as various petroleum fractions or cuts. For example, they may be used to effect the conversion of hydrocarbons by changing the carbon-to-hydrogen ratios thereof at elevated temperatures. The change in the carbon-to-hydrogen ratio may be effected by dehydrogenation, as for example in the dehydrogenation of paraffin hydrocarbons to the corresponding monoolefins, the dehydrogenation of paraffins or monoolefins to the corresponding diolefins or acetylenes, or the formation of cycloolefins, cyclodiolefins or aromatic hydrocarbons from aliphatic or naphthene hydrocarbons; or the change may be effected by hydrogenation, as, for example, in the nondestructive hydrogenation of diisobutylene to isooctane and in the nondestructive hydrogenation of unsaturated polymer gasoline into motor fuel of less, unsaturated characteristics. In certain instances, such changes in the carbon-to-hydrogen ratio may be accompanied by isomerization-type reactions, such as those involved in the reforming and/or cyclization of some hydrocarbons boiling in the motor-fuel range, such as in the conversion of hexane to benzene, heptane to toluene, etc. The catalysts are also useful for other treatments of hydrocarbon fractions or mixtures, such as desulfurization of sulfur-containing gasolines.

A chromium oxide gel catalyst suitable for effecting changes in the carbon-to-hydrogen ratios of hydrocarbons has been described in U. S. Patent No. 1,905,383, and in an article published by Frey and Huppke in Industrial and Engineering Chemistry, vol. 25, January, 1933, pp. 54–59. U. S. Patents Nos. 2,098,959 and 2,098,960 disclose the incorporation or homogeneous commingling with the chromium oxide of one or more difficultly reducible oxides, such as alumina, zirconia, thoria, silica, magnesia, titania, boric oxide, or the like, in such a way that the gel characteristics are conserved, as by coprecipitation or by intimate intermixing of the freshly precipitated hydrous oxides; incorporation of readily reducible heavy-metal oxides, such as those of thallium, bismuth, lead, and mercury, is also disclosed. In the preparation of these catalysts, which contain unglowed chromium oxide, a solution containing a chromic salt is used, and dark-green gelatinous hydrated chromium oxide is formed by precipitation with an alkali solution, such as a solution of ammonia, sodium hydroxide, potassium hydroxide, or the like. The hydrous material comprising the green gelatinous hydrated chromium oxide is suitably washed and dried; the resulting homogeneous oxide mixture is broken into granules of a suitable size, and it is suitably reduced in an atmosphere of a reducing gas before being used as a catalyst.

The copending application of Morey and Frey, Serial No. 173,709, filed November 9, 1937, which has issued as Patent No. 2,312,572, discloses that the drying of the hydrous gel is advantageously controlled in such a way that the gel contains, immediately before the reducing step, chromium with a valence of more than three, but at least in part probably less than six, to an extent equivalent to a hexavalent-chromium content of 1 to 40 per cent, preferably 15 to 35 per cent, of the total chromium. The desired content of higher-valent chromium is preferably obtained by drying the hydrous material in an oxidizing atmosphere, such as air, at a temperature gradually increasing from room temperature to a temperature within the range of about 300 to 400° F.

The last-mentioned copending application (Patent No. 2,312,572) also discloses that the reducing step is advantageously conducted in a reducing atmosphere under such conditions that the temperature of the chromium oxide rises slowly within the range of about 300 to 570° F. and that reduction of chromium with a valence higher than three is effected without spontaneous thermal decomposition of more than a negligible proportion of chromium oxide having such higher-valent chromium. Simultaneously, the gel is dehydrated beyond the state reached in the preceding drying in an oxidizing atmosphere. Still further dehydration is effected by a raising of the temperature, after the reduction is complete, above 570° F.; the dehydration is substantially complete if the temperature is raised to a value within the range preferred for the dehydrogenation of hydrocarbons, namely, about 750 to 1100° F.

When a catalyst containing unglowed chromium oxide is used for the conversion of hydrocarbons by changing the carbon-to-hydrogen ratios thereof, it is maintained at an elevated temperature, generally within the range of 390 to 1100° F. The lower part of this range is relatively most useful in the hydrogenation of unsaturated hydrocarbons, and the upper part in the dehydrogenation of hydrocarbons. The pressure and the time of contact may be varied over wide ranges, in accordance with the requirements of the particular conversion in hand. For example, the pressure may be atmospheric; or it may be superatmospheric, which is advantageous for hydrogenation; or it may be subatmospheric, which is advantageous for dehydrogenation, although, of course, slight superatmospheric pressures are generally used even in dehydrogenation processes, in order to secure more practical operation. Similarly, for a particular temperature, a contact time of a fraction of a second to several seconds may be adequate for dehydrogenation of a paraffin to the corresponding mono-olefin, but more than several seconds may be necessary to effect further dehydrogenation or cyclization. In any particular case, suitable conditions of use may be readily found by trial. The catalysts may be repeatedly revivified by burning off carbonaceous or other matter, deposited thereon during use, with an oxidizing or oxygen-containing gas; the revivified catalyst has a restored activity and can be used again for the conversion of hydrocarbons.

The foregoing gives briefly the general conditions of preparation and of use of catalysts comprising dark or black unglowed chromium oxide. However, not all solutions of chromic salts yield the desired dark-green hydrated chromium oxide on precipitation with an alkali. Many solutions yield a nongelatinous precipitate, such as a precipitate containing a high proportion of light blue-green chromic hydroxide, which dries to a more or less chalk-like powder having little or no catalytic activity for the treatment or conversion of hydrocarbons. Still other solutions, especially solutions of certain forms of chromic sulfate, may yield little or no precipitate on the addition of an alkali; however, on being boiled they generally do form a nongelatinous precipitate that on drying forms bluish chalk-like chromic oxide, which on drying has a low or negligible activity in the dehydrogenation, or hydrogenation, of hydrocarbons.

Although the reason for the differences in the behavior of various solutions of chromic salts upon the addition of an alkali is not clearly understood, a process has been disclosed in my aforementioned copending application Serial No. 113,091 (Patent No. 2,288,320) whereby the chromium is brought into such a condition that it does yield the desired dark-green hydrated gelatinous chromium oxide upon the addition of an alkali. In brief, this process comprises digesting nongelatinous or bluish chalky chromic hydroxide or oxide in a limited amount of an acidic aqueous solution, the acidity of the mixture being limited and the anions therein consisting predominantly of anions of a monobasic acid whose normal chromic salt is soluble in water and hydrolyzes to give free acid; the digesting is continued until the chromium becomes capable of being precipitated as dark-green gelatinous hydrated chromium oxide by an alkali in slight excess. After the chromium has been brought into the desired condition, it is precipitated and used for the preparation of a catalyst in accordance with the principles already discussed.

I have now found that an improved catalytic material can be prepared by incorporating, in a new and novel manner, unglowed chromium oxide upon a porous support. In its simplest form, the preparation of such a catalyst is effected by treating a concentrated aqueous solution of a chromic salt with less than a chemically equivalent amount of an alkali, intimately mixing with the resultant aqueous material a granular supporting material, and subsequently treating the resultant mixture with such an additional amount of alkali that the total amount of alkali used is equivalent to, or in slight excess of, the amount chemically or stoichiometrically equivalent to the original chromic salt. The resultant mixture of solid materials is freed from excess water and is washed to remove water-soluble material, and it is subsequently dried and treated in accordance with procedures already discussed herein for preparing catalysts comprising chromium oxide. I prefer that the initial amount of alkali present should be between 25 and 75 per cent of the chemically equivalent amount of chromium figured as trivalent chromium, and preferably it should be between about 50 and 70 per cent of the equivalent amount.

I have further found that a preferred form of my improved catalytic material comprises dark unglowed chromium oxide incorporated upon a support and prepared from a form of chromium oxide that normally does not form a catalytic material suitable for the conversion of hydrocarbons or the treatment of hydrocarbon fractions. As disclosed in my copending application Serial No. 113,091 (Patent No. 2,288,320), of which this is a continuation-in-part, various chromic salts, when initially treated with an alkali, give a nongelatinous precipitate of chromium hydroxide or oxide that does not form a highly active catalyst for the treatment of hydrocarbons. As further disclosed in said copending application, such nongelatinous chromium oxide can be so treated in the presence of a limited amount of a monobasic acid that it is converted to a form that will produce a gelatinous hydrous chromium oxide precipitate upon the addition of a suitable amount of an alkali. This treatment may comprise adding to the nongelatinous precipitate a monobasic acid in an amount between 25 and 50 per cent of the amount chemically equivalent to the chromium oxide. Other procedures giving mixtures equivalent to the resulting mixture may be used instead; for example, if the initial material is a chromic salt of a monobasic acid that upon the addition of alkali would form a nongelatinous precipitate, the treatment may comprise adding to a concentrated solution of the salt one-half, or slightly more, of the amount of an alkali that would be required to convert the chromic salt to chromic hydroxide. Further treatment of the resultant mixture by digesting it in accordance with the procedure described in my aforementioned application (Patent No. 2,288,320) changes the chromium until it is in a form suitable for yielding a gelatinous precipitate. In preparing this preferred form of my improved catalytic material, I mix a granular support with the material resulting from this digesting part of the treatment of my previously disclosed process, which comprises adding a limited amount of a monobasic acid to a nongelatinous chromium oxide or adding a limited amount of an alkali to a chromic salt of a monobasic acid that would form a nongelatinous precipitate, and subsequently I add an alkali in slight excess to effect final precipitation of the chromium as dark-green gelatinous hydrated chromium oxide.

An object of the present invention is to provide a process for preparing supported catalysts comprising chromium oxide.

Another object is to provide supported catalysts comprising unglowed chromium oxide.

Another object of my invention is to provide a process for the utilization of chromic compounds normally incapable of forming a dark-green gelatinous precipitate upon addition of an alkali for the preparation of supported catalysts comprising dark or black unglowed chromium oxide.

Other objects and advantages of the invention will be obvious to those skilled in the art, from the accompanying disclosure.

In one specific embodiment, the invention comprises the process of transforming a chromic compound normally incapable of giving a dark-green gelatinous precipitate upon the simple addition of an alkali in slight excess so that it becomes capable of giving such a precipitate, and incorporating the chromium in the chromic compound with a granular porous carrier, the chromium being in the form of dark-green gelatinous hydrated chromium oxide obtained by precipitation by an alkali in slight excess.

In this embodiment, the initial chromic compound may be any chromic compound that does not yield a dark-green gelatinous precipitate of hydrated chromium oxide upon addition of an alkali in slight excess. For example, it may be the light blue-green chalky precipitate of chromic hydroxide or hydrous oxide that at times is obtained, especially if considerable sulfate is present, when a solution of an alkali is mixed with a solution of a chromic salt or with a solution prepared by the reduction of the chromium in a hexavalent chromium compound, such as a chromate or a dichromate, to the trivalent condition. Such chromic oxide is generally somewhat hydrated and may vary considerably in color and physical characteristics, sometimes possessing the desirable dark-green color and/or the desirable gelatinous texture to a minor degree. Other suitable chromic compounds are those that yield such nongelatinous chromic oxide on addition of an alkali; examples are certain forms of chromic sulfate and chromic chloride, violet chromic nitrate, and the like. Still other suitable chromic compounds are those that yield a precipitate only upon boiling after the addition of an alkali. Also to be included among suitable chromic compounds for this specific embodiment of my invention is light green chromic oxide, which may be from any source, such as deteriorated or glowed chromium oxide catalysts, chromium compounds that have undergone a spontaneous thermal decomposition, or the like.

If desired, the nongelatinous chromic hydroxide or hydrous oxide, which is generally bluish and chalky, may be obtained by precipitation with an alkali, preferably ammonium hydroxide, from a solution of a chromic salt or from a solution prepared by the well-known wet-method reduction of the chromium in a hexavalent chromium compound to the trivalent condition. In some cases, standing for some hours, or heating or boiling for a more or less prolonged period, may be necessary to aid the precipitation. The precipitate may be separated from the solution and may be washed to reduce the content of occluded salts or ions; if desired, it may have been aged for days or weeks, but aging is not necessary.

Any such initial chromic compound is transformed or converted, according to the process of my invention, so that it becomes capable of yielding a dark-green gelatinous precipitate of hydrated chromium oxide upon addition of an alkali. The procedure for this transformation varies somewhat for different initial chromic compounds, but in general it involves digesting nongelatinous chromic hydroxide or hydrous oxide in a limited amount of a concentrated acidic aqueous medium whose anions consist predominantly or substantially entirely of anions of a monobasic acid whose normal chromic salt dissolves in water and hydrolyzes to give free acid. The digesting is continued until the chromium present becomes capable of being precipitated as dark-green gelatinous hydrated chromium oxide by an alkali; if necessary, the acidity of the solution is increased somewhat during the digesting, but the acidity need not exceed that present in a mixture of chromic oxide and one-half of the amount of such an acid that is chemically equivalent to the chromic oxide. The digesting temperature is preferably about 200 to 250° F.

In one specific embodiment of the invention, bluish chalky chromic oxide is treated with about one-fourth as much of a monobasic acid as would be stoichiometrically required to convert all of the oxide to the corresponding normal chromic salt. Although any monobasic acid whose normal chromic salt dissolves in water is suitable, a strong monobasic acid, such as hydrochloric, nitric, or trichloracetic acid, is preferred, as its action is more rapid than that of a weaker acid, such as acetic or other monocarboxylic acid having up to four carbon atoms per molecule. The mixture of acid and oxide is triturated until it becomes a colloidal solution or sol, and if quite concentrated it will resemble a paint in appearance; the water content of the mixture is preferably such that a buttery or creamy consistency is obtained, although at times much higher water contents may be present. The resulting mass is preferably digested at about its boiling point while being vigorously stirred, until it becomes very thick and viscous; this digesting may require several hours. Then a small sample of the resulting sol is diluted with water, preferably hot water, and made alkaline, preferably with ammonium hydroxide. If a dark-green gelatinous precipitate is obtained, the digesting is complete; if the precipitate is not sufficiently dark green and gelatinous, the digesting must be continued, preferably after addition of more monobasic acid, suitably in portions of about one-tenth of that originally used. This process of adding acid and/or digesting is continued until a test portion of the sol yields a suitable dark-green gelatinous precipitate upon being made alkaline.

If the original chromic compound is in the form of bright-green chromic oxide, such as that in deteriorated or glowed chromium oxide catalysts or that obtained by heating compounds containing hexavalent chromium to a temperature at which spontaneous thermal decomposition occurs, it is advantageously dissolved by hot concentrated sulfuric acid in the presence of chromium with a valence greater than three, which acts as a dissolution catalyst; then chromic hydroxide or hydrous oxide is precipitated by the addition of an alkali, and the precipitate is treated in the manner already described. If a spent catalyst is used as the source of the chromic oxide, any carbonaceous deposit thereon preferably should be removed, as by oxidation with air, before the dissolution in hot concentrated sulfuric acid.

In the digesting procedure, instead of a monobasic acid, an equivalent amount of the corresponding chromic salt may be used. Similarly, in the preparation of a mixed oxide catalyst, the acid may be introduced in a state of chemical combination with one or more of the metallic elements of the catalyst, such as a suitable salt of aluminum, zirconium and the like, among which is chromium, as in the form of one or more salts. Such chromic or other salts of monobasic acids may be considered to undergo hydrolysis in aqueous solution, liberating the free acid, and thus they are more or less equivalent to the acid itself. However, salts of metals that would impair the activity of the final catalyst should be avoided.

A convenient way of obtaining the desired degree of acidity in a mixture to be digested is to add enough alkali, preferably ammonium hydroxide, to a concentrated solution comprising a chromic salt of a suitable monobasic acid to combine with about half, or somewhat more, of the acid present in the chromic salt, whereby an incomplete formation of hydrous chromium oxide is effected, and the residual chromic salt supplies the acid required for the digesting. The resulting mixture is then heated, whereby it is concentrated and digested in a manner similar to that just described. After such digesting is completed, the chromium is incorporated as dark-green gelatinous hydrated chromium oxide in a catalytic mixture that, upon drying and reducing, preferably in accordance with the aforementioned copending application of Morey and Frey (Patent No. 2,312,572), yields the desired catalyst.

Besides the chromium oxide and any other desired catalytic, promoting, or stabiliing oxide or material, the catalytic mixture comprises a support or carrier whose chief function is to support the catalytic oxide or oxides but whose properties may include a catalytic activity for the treatment of hydrocarbons that is less pronounced than that of black unglowed chromium oxide, or some promoting or stabilizing characteristics. Thus, to a concentrated solution of chromic chloride, such as a solution that is approximately one molar or somewhat stronger, there is added with stirring an amount of a concentrated solution of an alkali, such as ammonium, sodium, or potassium hydroxide, equivalent to 50 to 75 per cent of the chromic chloride, while the mixture is heated to a somewhat elevated temperature. To the resultant mixture is then added a porous granular supporting material in an amount equal to about three times the weight of the chromic oxide equivalent of the total chromium present. While this mixture is stirred, additional alkali is added to precipitate hydrous chromium oxide completely. In this manner the porous granular supporting material is thoroughly impregnated with, and subsequently coated with, hydrous chromium oxide. The impregnated and coated support is washed with water and dried in air, and after reduction is quite active and rugged and highly efficient for the formation of polymerizable olefins from paraffinic hydrocarbon gases heavier than methane.

The support or carrier may, in general, be any granular porous material that is capable of withstanding elevated temperatures, up to about 1400° F., and the conditions present during revivification of the catalyst by an oxygen-containing gas at an elevated temperature. Particularly desirable are minerals capable of withstanding dehydrogenation temperatures without mechanical failure and possessing not only high specific surface and porosity but also ready perviousness. Supports having these characteristics are obtained from hydrous minerals, especially hydrous crystalline minerals such as gypsum, gibbsite, or the like, by heating them to drive out combined water, so that a pervious skeletal structure of the mineral itself remains. Certain metamorphosed minerals, such as mica and its relatives and various clays having a somewhat stratified structure, such as bentonite and montmorillonite, may be used as supports; those having good porosity and perviousness may be readily selected by simple tests for these characteristics. Among suitable preferred carriers are alumina, bauxite, kieselguhr, magnesia, silica gel, thoria, and zirconia. These supports are not to be considered as being complete equivalents of each other; they may or may not possess catalytic activity of their own. Of these materials, alumina and bauxite are preferred, especially hard bauxite, such as that found as pebbles in the region around Bauxite, Arkansas; such bauxite exhibits an exceptionally high resistance to abrasion and an exceptionally good catalytic activity for the treatment of hydrocarbons, and it is less expensive, all things being considered, than most of the other carriers mentioned. The carrier, in the form of granules of any desired size, is preferably heated before use to a temperature of about 1100° F., in order to expel volatile matter and to increase its porosity. Extraneous soluble or finely divided matter may be advantageously removed by washing with water, a preliminary chemical treatment, especially with a dilute alkali solution, is also advantageous. Incorporation or combination of the dark-green gelatinous hydrated chromium oxide and any associated oxides with the carrier may be effected in several ways. A preferred procedure comprises diluting the viscous sol obtained from such a digesting as that already described, as by dispersing the sol in several times its own volume of hot water; admixing the carrier granules; and precipitating the catalytic hydrous oxides in and upon the carrier granules, as by adding an alkali, advantageously a volatile alkali like ammonium hydroxide, in slight excess. Another procedure comprises diluting the sol with about one to three times its own volume of hot water; admixing enough carrier granules to absorb the resulting diluted sol; mixing the granules containing the absorbed sol with a solution of an alkali in slight excess, whereby dark-green gelatinous hydrated chromium oxide is precipitated in the pores of the granules. When these procedures are used, the catalytic mixture comprising the carrier and the chromium oxide, after removal from the solution but prior to the drying step, is advantageously washed, as by decantation, on a filter or the like, to remove adhering solution and/or occluded salts. The catalyst or catalytic mixture is then dried and reduced.

Another procedure for combining the darkgreen gelatinous hydrated chromium oxide with the granular carrier comprises diluting the sol, as with several times its own volume of hot water; precipitating dark-green gelatinous hydrated chromium oxide by the addition of an alkali, preferably ammonium hydroxide; washing the precipitate; and mixing the washed precipitate with carrier granules. Such a procedure does not, however, produce results equivalent to those produced by the procedure just described. Still other procedures, which will be obvious to those skilled in the art, may be used at various times. However, I prefer to use one of the first-mentioned procedures, wherein the granular support is intimately mixed with the somewhat acidic, diluted chromium oxide sol, which must be treated with alkali to give the gelatinous precipitate. It appears that a superior catalyst results when such a procedure is followed. Although I am not sure as to the explanation for this superiority, it may be due to the combination of and impregnation of the carrier with, or an adsorption by the carrier of, colloidal chromium oxide with the subsequent precipitation of gelatinous chromium oxide upon the adsorbed oxide, resulting in a coating of the impregnated granules.

Any of the foregoing modes of incorporation of the chromium oxide with the carrier may be aided by the use of a vacuum to remove pocketed gas from the granular support and by maintaining a low pressure while mixing the granular support and the sol. Subsequent release of the vacuum causes the liquid or batter-like sol to be driven into the interstices of the support. Similarly, alternate heating and cooling may be used to drive the catalytic material into the support. Also, the impregnated granules may be partially or wholly dried and reimpregnated and coated as many times as desired, to increase the quantity of catalytic material incorporated with the carrier.

The carrier granules may be of any desired size and shape; a size within the range of 4 to 20-mesh is preferred. The size may be outside of this preferred range, but if it is much smaller than 20-mesh, the mixture comprising carrier and dark-green gelatinous chromium oxide is preferably put into the form of composite granules, each consisting of several carrier granules coated by, or embedded in, the chromium oxide. These may be obtained by separating the mixture of carrier granules and chromium oxide from the solution, as by filtering, expressing the solution by pressure, or the like; breaking up the resulting cake into composite granules of suitable size; and drying and reducing the chromium oxide in the composite granules to form the desired catalyst. Alternatively, similar composite granules may be obtained by preparing a precipitate of dark-green gelatinous hydrated chromium oxide in accordance with the present invention; separating the precipitate from the solution; admixing the carrier, in the form of small granules or of a powder, with the precipitate; exuding the resulting mixture through an opening, to form threads or rods of a desired diameter; drying the resultant threads; breaking up the threads into composite granules of the desired size; and reducing the chromium oxide to form the desired catalyst. Other methods of obtaining composite granules, such as pelleting, will be obvious to those skilled in the art.

The proportion of chromium oxide to carrier in the final catalyst may be varied widely; a chromium oxide content of 5 to 50 per cent by weight of the final catalyst is preferred, but contents outside of this range may be used, if desired.

As hereinbefore mentioned, one or more oxides other than chromium oxide may be present as constituents of the final catalyst, such as alumina, thoria, zirconia, silica, magnesia, titania, boric oxide or the like. These may be incorporated in the catalyst in various ways that will be obvious to those skilled in the art. For example, they may be coprecipitated with the dark-green gelatinous chromium oxide, or they may be precipitated separately and then mixed intimately with chromium oxide, as by trituration. The first mentioned procedure is preferred.

The details of drying and of reducing the chromium oxide in the supported catalysts of the present invention preferably are substantially the same as those that are mentioned hereinbefore for chromium oxide gel catalysts and that are also disclosed in the aforementioned copending application of Morey and Frey (Patent No. 2,312,572).

The following examples are given purely for the purpose of illustrating some of the many possible modes of practicing the invention; they are not to be taken as necessarily establishing limitations of the invention.

*Example I*

About 300 grams of sodium dichromate is reduced with sugar in the presence of an excess of sulfuric acid. The resulting chromic sulfate solution is diluted with several liters of hot water, and ammonium hydroxide is added to the hot solution to precipitate the chromium. The resulting precipitate of light blue-green powdery chromic hydroxide is washed by decantation, filtered, pressed to remove excess water, and triturated in about 400 cc. of concentrated hydrochloric acid until no lumps remain. The resulting mixture is stirred and digested at about its boiling point for about an hour. A small amount of the resulting thick, viscous sol is diluted with hot water, and ammonium hydroxide is added to precipitate the chromium. As the resulting precipitate is not dark-green gelatinous, about 40 cc. of concentrated hydrochloric acid is added to the main sol, and the digesting is continued for about three more hours. As a second test precipitate now shows the desired dark-green color and gelatinous consistency, the sol is diluted with several liters of hot water, and about a liter of previously dehydrated bauxite granules is added and thoroughly mixed with the diluted sol. Dark-green gelatinous hydrated chromium oxide is now precipitated by the addition of ammonia in slight excess, while the mixture is so agitated that the precipitate is distributed uniformly upon the bauxite. The resulting mixture of bauxite granules and gelatinous chromium oxide is washed by decantation, filtered, dried for several days in air at a temperature gradually increasing from room temperature to about 300° F., and reduced and dehydrated in a stream of hydrogen at a temperature gradually increasing from about 300 to about 1000° F. The resulting catalyst comprises black unglowed chomium oxide and is catalytically very active for the conversion of hydrocarbons; it is rugged and long-lived.

A butane fraction from natural gas is heated to a temperature of about 1050° F. and passed over a large mass of this granular catalyst in a suitable catalyst chamber, under a pressure such that the pressure on the effluent stream is about 5 pounds per square inch gauge. The flow rate is maintained at about 3,000 volumes of gaseous butane, at normal temperature and pressure, per volume of catalyst mass per hour. The effluent contains about 20 per cent by volume of butenes, only a slightly greater amount of free hydrogen, together with about 1 per cent of other light gases, with the remainder being unreacted butane. Under these conditions the catalyst declined only slightly in activity during a period of 24 hours, and when finally taken out of service is readily reactivated, with a minimum of mechanical disintegration, by burning out with a gas containing initially about 1 per cent of free oxygen. After this burning-out procedure and subsequent reduction with hydrogen it is again suitable for additional use.

Example II

One mol, 400 grams, of crystalline violet chromic nitrate is melted in its water of crystallization, and 140 cc. of 28 per cent aqua ammonia, which is sufficient to react with about two-thirds of the chromium, is added slowly while the mixture is stirred and heated. On continued heating and evaporation of the mixture, the resulting light-blue chalky precipitate is dispersed into a sol that eventually becomes very thick and viscous. After about three hours of such heating, during which the temperature increases to about 250° F., a test portion, diluted with hot water and treated with a slight excess of ammonium hydroxide, yields a dark-green gelatinous precipitate. The sol is diluted with about twice its own volume of hot water and slowly poured into about a liter of dried alumina-gel granules, which are agitated to ensure uniform distribution of the sol; the mixture is heated, if necessary, to drive off any excess water, so that all of the sol is absorbed by the granules. The granules are mixed with an excess of a dilute solution of ammonium hydroxide, whereupon dark-green gelatinous hydrated chromium oxide is precipitated in the pores of the alumina granules. The granules are washed three times by decantation, and are dried, dehydrated, and reduced as in Example I. The catalyst thus produced has an excellent catalytic activity for the conversion of multicarbon paraffins into monoolefins and is rugged and long-lived. It is also useful and rugged for the production, under dehydrogenating conditions, of diolefins such as butadiene from monoolefins of the same number of carbon atoms per molecule.

Example III

An aqueous solution having a concentration of approximately one mol per liter is prepared from green chromic nitrate. To this solution is added, with thorough stirring, sufficient sodium hydroxide to be equivalent to about 55 per cent of the chromium, that is, a little over one and one-half mols of sodium hydroxide is added for every mol of chromic nitrate.

A thorough stirring of the solution is continued, and three-fourths of an equal volume of granular, calcined magnesite, screened to 4 to 8-mesh, is slowly added. Agitation of the mixture is continued while additional sodium hydroxide is slowly added until a slight excess is present. The granules, which now are impregnated and coated with gelatinous chromium oxide, are washed and dried in air at a slowly increasing temperature to a final temperature of about 400° F. The catalyst is then reduced by treatment with hydrogen, and is highly efficient and rugged for the treatment of a natural-gasoline fraction to increase its octane number, and for the dehydrogenation of lower-boiling hydrocarbons.

Example IV

Sodium dichromate is reduced with sugar in the presence of an excess of hydrochloric acid. Three-fourths of the resulting chromic chloride solution is diluted with hot water, and the chromium is precipitated by the addition of ammonia in slight excess. The resulting light blue-green chalky precipitate is washed by decantation, filtered, and pressed to remove excess water. The remaining one-fourth of the chromic chloride solution is concentrated by heating until it becomes a syrup. The syrup and the precipitate are mixed and triturated until a homogeneous-appearing sol results. The mixture is digested at about 215° F., and at intervals, successive small amounts of concentrated hydrochloric acid are added until a test portion of the sol, when diluted and treated with ammonia in slight excess, yields a dark-green gelatinous precipitate. The sol is then diluted with hot water, and ammonia is added in slight excess to precipitate the chromium as dark-green gelatinous hydrated chromium oxide. The precipitate is washed three times by decantation, filtered, and mixed with about three times its volume of granules of dehydrated bauxite. The coated bauxite is dried, dehydrated, and reduced as in Example I. The resulting catalyst is rugged and long-lived when used to effect treatments of hydrocarbons.

Many modifications of the invention will be obvious to those skilled in the art. For example, the digesting may be effected at increased temperatures in an autoclave, whereby the period of digesting is appreciably decreased. In view of the many possible modifications, the invention should not be limited unduly by the foregoing specification and examples, but it should be understood to be as extensive in scope and equivalents, within the scope of the appended claims, as the prior art allows.

The practice of the invention results in the preparation of supported chromium oxide catalysts, which preferably comprise dark or black unglowed chromium oxide. It utilizes chromic compounds originally incapable of forming dark-green gelatinous hydrated chromium oxide, for the preparation of such supported catalysts comprising black unglowed chromium oxide. These catalysts are highly efficient for the treatment and conversion of hydrocarbons and petroleum fractions, but they may also be used for other conversions in which they are effective.

I claim:

1. A process for preparing a chromium oxide catalyst, which comprises digesting a mixture comprising nongelatinous hydrous chromium oxide in a concentrated acidic aqueous medium whose anions consist substantially entirely of anions of a monobasic acid whose normal chromic salt is soluble in water and hydrolyzes to give free acid, said mixture having an acidity not substantially greater than that present in a mixture of chromic oxide and one-half its chemical equivalent of such a monobasic acid, said digesting being continued for such a period of time that a sol is obtained that is capable of yielding a dark green and gelatinous precipitate on the subsequent addition of an alkali in slight excess, admixing therewith a porous granular supporting material, adding an alkali in slight excess to precipitate gelatinous hydrous chromium oxide, and washing and drying the resultant impregnated and coated material.

2. In a process for preparing a catalyst, the steps which comprise digesting a mixture comprising nongelatinous hydrous chromic oxide and an acidic aqueous solution whose anions consist predominantly of anions of a monobasic acid whose normal chromic salt dissolves in water and hydrolyzes to give free acid, said acidic solution being used in such an amount, not exceeding that required stoichiometrically to produce a mixture comprising equal amounts of chromium in the form of chromic oxide and in the form of the chromic salt of said monobasic acid, and said digesting being continued for such a time that a viscous sol is obtained that is capable of yielding a dark-green gelatinous precipitate on addition of an alkali in slight excess, and incorporating the chromium in said sol with a granular porous carrier, the chromium being in the form of dark-green gelatinous hydrated chromium oxide obtained by precipitation by an alkali in slight excess.

3. A process for preparing a catalyst, which comprises digesting a mixture comprising nongelatinous hydrous chromic oxide and an acidic aqueous solution whose anions consist predominantly of the anions of a monobasic acid whose normal chromic salt dissolves in water and hydrolyzes to give free acid, said acidic solution being used in an amount not in excess of that required stoichiometrically to produce a mixture comprising equal amounts of chromium in the form of chromic oxide and in the form of the chromic salt of said monobasic acid, and said digesting being continued for such a time that a sol is obtained that is capable of yielding a dark-green gelatinous precipitate on addition of an alkali in slight excess, incorporating the chromium in said sol with a granular porous carrier, the chromium being in the form of dark-green gelatinous hydrated chromium oxide obtained by precipitation by an alkali in slight excess, and drying and reducing the resulting supported chromium oxide catalyst.

4. The process as defined in claim 3 and further characterized in that the chromium in said sol is incorporated with said carrier by diluting said sol, precipitating dark-green gelatinous hydrated chromium oxide from the diluted sol by the addition of a solution of said alkali, washing the precipitated chromium oxide, and mixing the washed chromium oxide with said granular carrier.

5. A process for preparing a catalyst, which comprises digesting a mixture comprising bluish chalky hydrous chromic oxide with a concentrated aqueous solution of a monobasic acid whose normal chromic salt dissolves in water and hydrolyzes to give free acid, the amount of aqueous solution being equivalent to approximately one-fourth that amount required stoichiometrically to convert all of the chromic oxide to the corresponding normal chromic salt, until the mixture becomes a viscous sol, adding from time to time additional small amounts of aqueous solution of the monobasic acid while continuing the digesting until a small test portion of the resultant sol, when diluted with hot water and treated with a solution of an alkali in slight excess, yields a dark-green and gelatinous precipitate, the total amount of aqueous solution of the monobasic acid that is used not exceeding one-half of that required stoichiometrically to convert all of the chromic oxide to normal chromic salt, incorporating the chromium in said sol with a granular porous carrier, the chromium being in the form of dark-green gelatinous hydrated chromium oxide obtained by precipitation by an alkali in slight excess, and drying and reducing the resulting supported chromium oxide.

6. A process for preparing a catalyst, which comprises digesting a mixture comprising bluish chalky hydrous chromic oxide and a concentrated aqueous solution of a chromic salt of a monobasic acid in an amount equivalent to approximately one-half as much chromium as said chromic oxide, until the mixture becomes a viscous sol, adding from time to time additional small amounts of the chromic salt while continuing the digesting until a small test portion of the resultant sol, when diluted with hot water and treated with a solution of an alkali in slight excess, yields a dark-green gelatinous precipitate, the chromium in the total amount of chromic salt added not exceeding the total amount of chromium in said chromic oxide, incorporating the chromium in said sol with a granular porous carrier, the chromium being in the form of dark-green gelatinous hydrated chromium oxide obtained by precipitation by an alkali in slight excess, and drying and reducing the resulting supported chromium oxide.

7. A process for the preparation of a supported chromium oxide gel catalyst, which comprises digesting a mixture comprising nongelatinous hydrous chromic oxide with an amount of hydrochloric acid that is equivalent stoichiometrically to from approximately 25 to approximately 50 per cent of the chromic oxide in the mixture, for such a period of time that the product obtained yields a dark-green and gelatinous precipitate of hydrous chromic oxide on the addition of alkali, admixing therewith a porous granular catalyst supporting material, adding an alkali in slight excess to precipitate gelatinous hydrous chromic oxide, and washing and drying the resultant impregnated and coated material.

8. A process for the preparation of a supported chromium oxide gel catalyst, which comprises digesting a mixture comprising nongelatinous hydrous chromic oxide with an amount of nitric acid that is equivalent stoichiometrically to from approximately 25 to approximately 50 per cent of the chromic oxide in the mixture, for such a period of time that the product obtained yields a dark-green and gelatinous precipitate of hydrous chromic oxide on the addition of alkali, admixing therewith a porous granular catalyst-supporting material, adding an alkali in slight excess to precipitate gelatinous hydrous chromic oxide, and washing and drying the resultant impregnated and coated material.

9. A process for the preparation of a supported chromium oxide gel catalyst, which comprises adding to a concentrated aqueous solution of chromic nitrate an amount of an alkali which is equivalent stoichiometrically to approximately two-thirds of the chromic nitrate, digesting the mixture for such a period of time that the product obtained yields a dark-green and gelatinous precipitate of hydrous chromic oxide on the addition of alkali, admixing therewith a porous granular catalyst support, adding an alkali in slight excess to precipitate gelatinous hydrous chromic oxide, and washing and drying the resultant impregnated and coated material.

10. A process for the preparation of a supported chromium oxide gel catalyst from a chromic compound that normally yields a substantially nongelatinous precipitate of hydrous chromium oxide when alkali is added to an aqueous solution thereof, which comprises adding to a concentrated aqueous solution containing such a chromic compound alkali to precipitate nongelatinous hydrous chromic oxide, segregating the precipitated chromic oxide and digesting it with from approximately 25 to approximately 50 per cent of its stoichiometrical equivalent of a monobasic acid whose chromic salt is soluble in water and hydrolyzes to yield free acid, for such a period of time that the product obtained yields a dark-green and gelatinous precipitate of hydrous chromic oxide on the addition of alkali, admixing therewith a porous granular catalyst-supporting material, adding an alkali in slight excess to precipitate gelatinous hydrous chromic oxide, and washing and drying the resultant impregnated and coated material.

11. A chromium oxide catalyst prepared by the steps which comprise digesting a mixture comprising nongelatinous hydrous chromic oxide and an acidic aqueous medium whose anions consist predominantly of the anions of a monobasic acid whose normal chromic salt dissolves in water and hydrolyzes to give free acid, said acidic solution being used in an amount not exceeding that required stoichiometrically to produce a mixture comprising equal amounts of chromium in the form of chromic oxide and in the form of the chromic salt of said monobasic acid, and said digesting being continued for such a time that a sol is obtained that is capable of yielding a green gelatinous precipitate on the addition of an alkali in slight excess, admixing therewith a porous granular supporting material which consists predominantly of granules smaller than about 20-mesh, subsequently adding an alkali in slight excess to precipitate green gelatinous chromium hydroxide, washing and drying the resultant material in a manner such as to produce an impregnated and coated granular material comprising predominantly granules larger than 20-mesh and each containing a plurality of granules of said supporting material, and reducing the dried material in an atmosphere of a reducing gas.

12. A chromium oxide catalyst prepared by the steps which comprise digesting a mixture comprising nongelatinous hydrous chromium oxide and a concentrated acidic aqueous medium whose anions consist predominantly of the anions of a monobasic acid whose normal chromic salt dissolves in water and hydrolyzes to give free acid, said mixture having an acidity not substantially greater than that present in a mixture of chromic oxide and one-half its stoichiometric equivalent of such a monobasic acid, continuing said digesting for such a period of time that a sol is obtained that is capable of yielding a green and gelatinous precipitate on the addition of an alkali in slight excess, diluting said sol with water, admixing therewith sufficient granular supporting material to form a final catalyst comprising between 5 and 50 per cent chromium oxide, subsequently adding an alkali in slight excess to precipitate gelatinous chromium oxide, washing the resultant impregnated and coated material, drying the washed material, and reducing the dried material in an atmosphere of a reducing gas at a temperature rising sufficiently slowly within the range of about 300 to 570° F. that spontaneous thermal decomposition of chromium oxide is substantially avoided.

GLEN H. MOREY.

CERTIFICATE OF CORRECTION.

Patent No. 2,339,349. January 18, 1944.

GLEN H. MOREY.

It is hereby certified that error appears in the printed specification of the above numbered patent requiring correction as follows: Page 8, second column, line 15, claim 12, for "containing" read --continuing--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.